Aug. 6, 1968  E. J. NUNLIST ET AL  3,395,419

WIPER BLADE ASSEMBLY

Filed July 21, 1966  2 Sheets-Sheet 1

INVENTORS.
ERWIN J. NUNLIST
JOHN S. EYSTER

INVENTORS.
ERWIN J. NUNLIST
JOHN S. EYSTER 3,395,419
WIPER BLADE ASSEMBLY
Erwin J. Nunlist, Penfield, and John S. Eyster, Fairport,
N.Y., assignors to Ritter Pfaudler Corporation, Rochester, N.Y., a corporation of New York
Filed July 21, 1966, Ser. No. 566,934
6 Claims. (Cl. 15—246.5)

ABSTRACT OF THE DISCLOSURE

A wiper blade assembly for wiped film evaporators and the like has the wiper blades attached to the ends of cantilevered leaf springs extending tangentially from a torsion bar carried by the rotor of the evaporator substantially parallel to the axis of rotation, one end of the torsion bar being rotatable with respect to the other end wherein rotation of the rotatable end will vary the pressure of the wiper blade against the wiped surface along the length of the wiper blade.

---

This invention relates generally to a new and improved wiper blade assembly for creating a fluid film on a relatively large heated surface. More specifically, the present invention relates to a wiper blade assembly for use in a wiped film evaporator in which a film is continuously formed by a plurality of rotating spring-loaded wiper elements.

Many industries utilize processes of evaporation in some phase of production. It is a well-known principle that heat transfer and evaporation rates tend to be inversely proportional to the thickness of a layer of fluid in contact with a heated surface. A wiped film evaporator is a type of evaporator in which a thin film is produced by first feeding fluid to a heated surface and then passing a wiper blade over the heated surface to wipe off excess fluid. A continuous wiping action can be accomplished by having the wiper blades rotatably mounted and suspended within an upright heated cylindrical shell so that fluid introduced between the rotor and heated shell can flow down the interior of the shell. As fluid enters and runs down the interior of the heated shell, the rotor is turned causing the blades to agitate and advance fluid down the heated shell in a continuous wiping operation. The residue is then discharged from the bottom of the shell and the vapor, as condensate, leaves the vessel at an exit at the bottom.

In most wiped film evaporators, wiper blades are rigidly attached to a rotor coaxialy mounted within a cylindrical shell. Contact between the blade and the shell is assured by maintaining a fixed gap between the shell and the wiper blade that approximates the thickness of the desired fluid film. Because of the precise machining of the shell and rigid control of the dimensions of the wiper blade necessary to maintain the permissible gap and because of the inevitable change in gap caused by wearing of the wiper blade, other apparatus has been developed. For example, wiper blades have been mounted on the end of a pivotable arm which is free to swing outward and contact the shell under the influence of the centrifugal forces generated as the rotor turns. In another type of apparatus, wiper blades are movably positioned within vertical slide channels and under the influence of centrifugal forces slide radially within the channels to contact the shell.

While wiper blade mountings as described above are suitable for relatively small units, they have several features which are objectionable when constructing relatively large evaporators having diameters that sometimes exceed 60 inches and heights that sometimes exceed 19 feet. For instance, because these prior art types of blade mountings are designed so that centrifugal force will initiate and maintain blade-to-shell contact, rotor speed must be maintained at a rate sufficient to insure wiper-to-shell contact. However, excessive rotor speed will result in large contact forces and rapid wiper wear. Accordingly, in such embodiments, rotor speed is critical. It is an object of this invention to provide a wiper blade assembly that does not require critical control of rotor speed.

As set forth hereinabove, a wiped film evaporator is usually constructed with the rotor suspended within a cylindrical shell. Generally, the rotor is supported by bearings at its top and the bottom of the rotor is unsupported. This type of construction is used in wiped film evaporators for several reasons. For example, a bottom located journal is difficult to keep clean and, therefore, provides an area where contaminants can accumulate. To prevent such accumulation, frequent flushing of a bottom located journal is required. Furthermore, a rotor being supported at the top only can be quickly and easily removed from the shell for cleaning and service simply by using an overhead hoist or other like device to pull the rotor upwards and out of the shell. The prime, inherent disadvantage of this top rotor support construction is that even a slightly unbalanced rotor will tend to vibrate through its axis of rotation when turned. Near the rotor's critical speed, these vibrations will be in phase with the natural frequency of the rotor and the amplitude of these vibrations will increase and cause damage to the equipment. Therefore, continued rotation near the critical speed must be avoided. Neither the channel-type nor the pivot-type mountings described above help to stabilize the rotor or keep it from vibrating as the rotor reaches and passes through its critical speed. The channel-type mounting permits the wiper blade to float in the channel as the rotor vibrates. A pivoted blade does not provide rotor stabilization as there is a pivoted joint between the rotor and the wiper blade which permits the rotor to vibrate.

It is, therefore, another object of this invention to provide a wiper blade assembly that will increase the critical speed and function to stabilize the rotating rotor and thus reduce the adverse effect of rotation at or near the critical speed.

In pivot-type wiper assemblies, close tolerances must be maintained to insure blade contact over the entire area of the shell. As the shell size increases, it becomes more difficult to achieve such contact and particularly so if the shell surface is irregular. It is a further object of this invention to provide a wiper blade assembly that assures constant wiper blade contact over large areas of surface whether irregular or regular and yet does not require the maintenance of close tolerances to effect such contact.

In channel-type mounting, foreign material tends to build up on the wiper blade and impair the blades' radial sliding motion. In pivoted or articulated joints clogging occurs which sometimes renders the assembly inoperative. Thus, both channel-type and pivot-type assemblies necessitate frequent flushing operations to clear such build-up or clogging. It is another object of this invention to provide a wiper assembly that has no movable joints, pivots or channels and thus eliminates the contamination and fouling problems.

Generally, volatile components begin to evaporate as soon as fluid enters the heated shell. As the fluid runs down the inner surface of the shell, its viscosity increases as more and more evaporation takes place. Thus to maintain the same film thickness, more pressure is required in the lower regions. In a relatively large evaporator, it is difficult, if not impossible, to compensate for this increasing viscosity, and the efficiency of the entire system is adversely affected. It is thus a further object of this invention to provide a wiper blade assembly wherein blade pressure may be varied along the length of the blade to offset viscosity increase at the lower portion of the blade.

We have found that a wiper blade assembly generally comprising a plurality of circumferentially spaced adjustable torsion bars carried on a rotor, each bar lying substantially parallel to the axis of the rotor and having a plurality of leaf springs extending substantially tangentially from the rotor in a direction opposite to the direction of rotation in combination with an elongated wiper element extending across and supported by the outer ends of said springs and biased toward the surface to be wiped accomplishes the stated objects of this invention.

A complete understanding of the invention may be obtained from the following description and explanation which refer to the accompanying drawings illustrating the invention.

Figure 1:
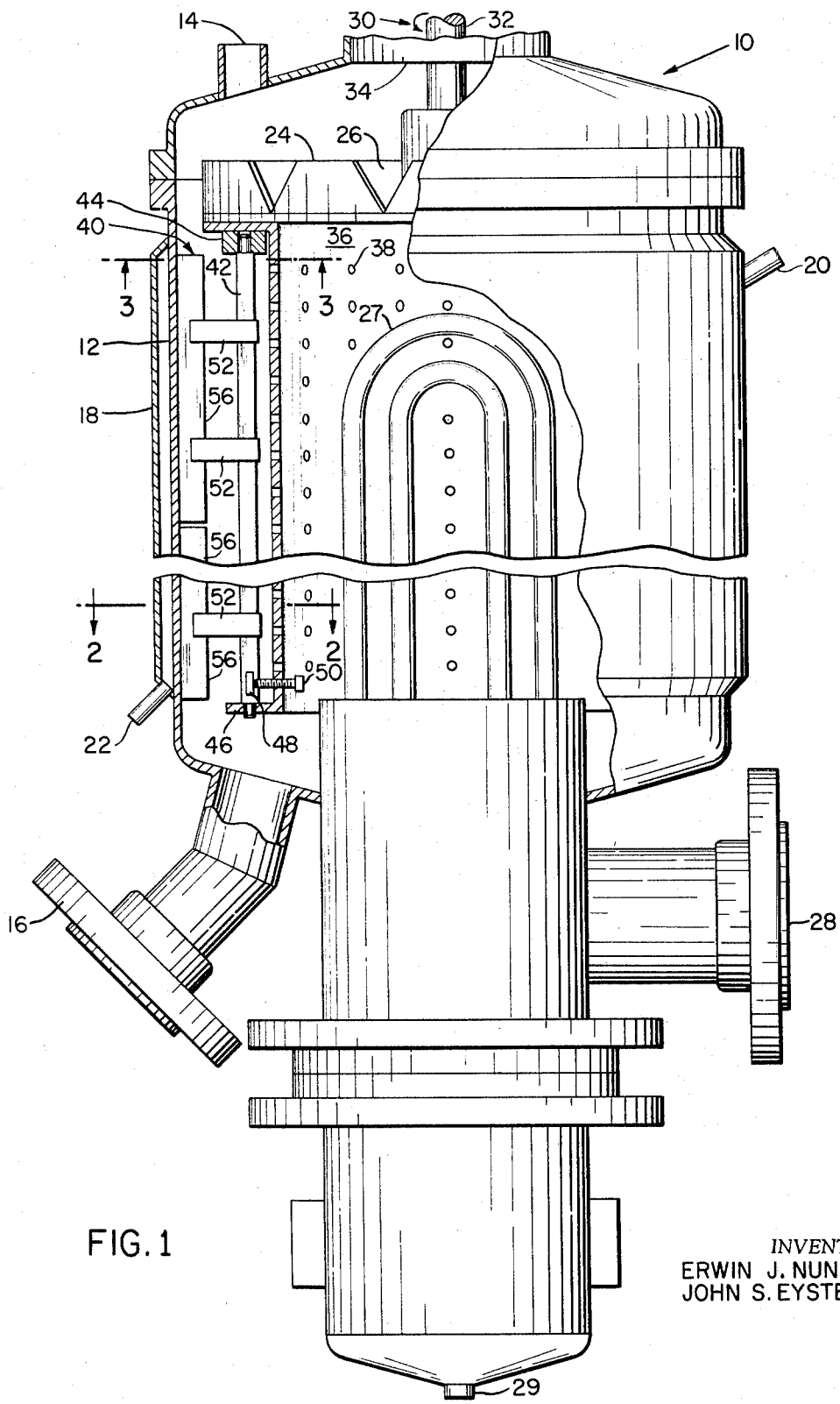
FIGURE 1 is a side elevational view partly in section of a complete wiped film evaporator assembly according to the invention.

Referring now to the drawings, FIGURE 1 shows a wiped film evaporator generally designated at 10 comprising: a cylindrical evaporator shell 12, having a jacket 18 circumferentially spaced and substantially surrounding shell 12; a rotor assembly generally designated at 30 and extending into the void of shell 12; and a wiper assembly generally designated at 40 connected to rotor assembly 30 and having elongated wiper blades 56 adapted to contact the inner surface of shell 12.

Still, in reference to FIGURE 1, but more specifically, jacket 18 surrounding shell 12 is provided with a fluid inlet 20 and a fluid outlet 22 through which fluid may be passed in contact with shell 12 to effect heat transfer through shell 12. A product inlet 14 and residue outlet 16 are also provided on shell 12. Within shell 12 and extending through the bottom thereof is a condenser 27 and an associated vacuum system 28.

A driving means (not shown) is mounted on top of shell 12 and drives rotor assembly 30 through a rotor shaft 32 which passes through a shaft seal 34. Rotor assembly 30 includes a cylindrical rotor body 36 having openings 38 therein, said body being suspended axially within the void of shell 12. Fixed atop rotor body 36 is a distribution head 24 having weir openings 26 therein. Product which enters at product inlet 14 is received upon head 24 and proceeds to pass through weir openings 26 from whence it spills down the inner surface of shell 12.

Wiper assembly 40 comprises a plurality of circumferentially spaced torsion bars 42, a plurality of wiper blades 56, and flat springs 52 connected to said torsion bars 42 at one end and to said wiper blades 56 at the other end. Each torsion bar 42 is positioned generally parallel to the rotor axis with its upper end fixed to a transverse plate 44 and its lower end pivoted in holes of flange 46. Torsion bar 42 has a pair of projections 48 at its lower end positioned opposite each other. A pair of adjusting screws 50 positioned to independently and adjustably exert pressure upon projections 48 are provided. Carried at spaced intervals along torsion bars 42 are an aligned series of flat springs 52 extending radially outward from torsion bars 42. Each spring 52 is adapted to clamp to torsion bar 42 and urge wiper blades 56 against the inner surface of shell 12. Wiper blades 56 are generally in sections as shown in FIGURE 1.

Figure 2:
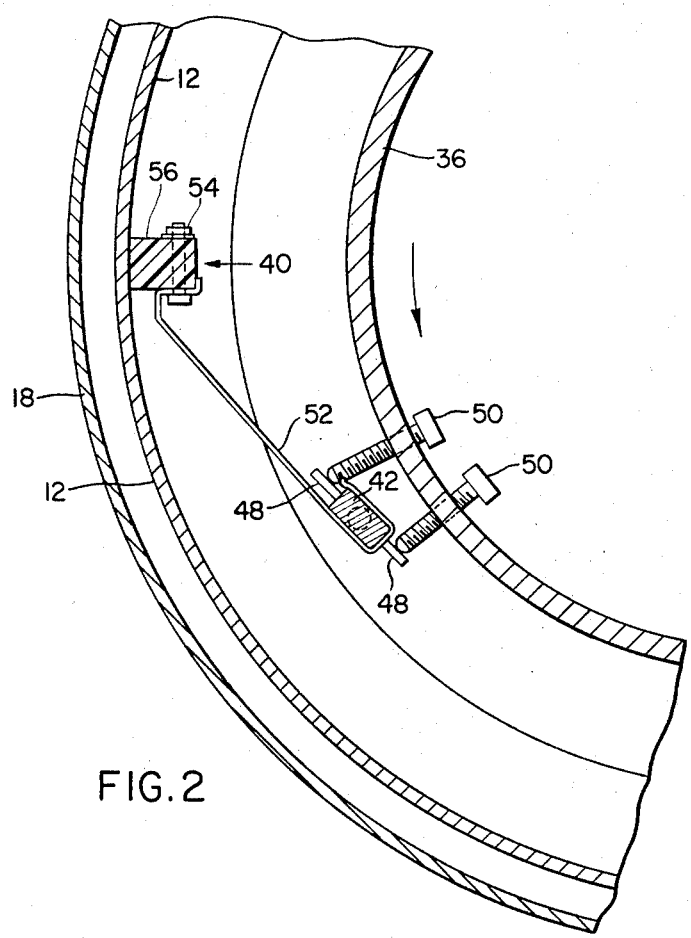
FIGURE 2 is a view in section along line 2—2 of FIGURE 1.
Figure 3:
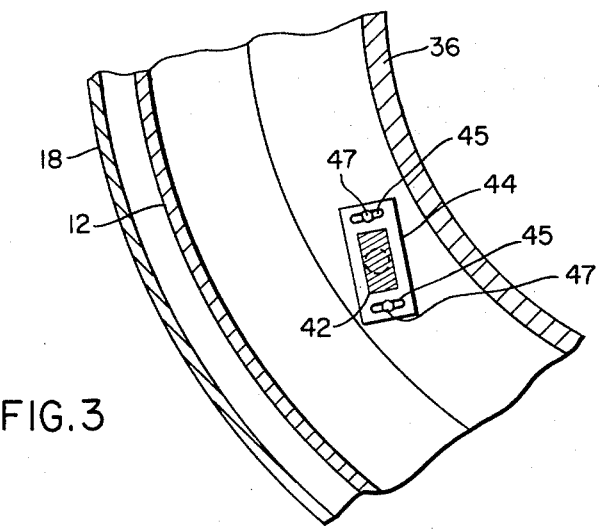
FIGURE 3 is a view in section along line 3—3 of FIGURE 1.

FIGURE 2 shows in detail the wiper blade assembly 40. Wiper blade 56 contacts the inner surface of shell 12 and is affixed by bolt and nut assembly 54 to one end of flat spring 52. The other end of flat spring 52 is snugly wrapped around torsion bar 42 and frictionally clamped thereon. The upper end of torsion bar 42 is fixed to transverse plate 44 (see FIGURE 3) which has slots 45 therein adapted for rotational adjustment of torsion bar 42 along its longitudinal axis by adjustment of screws 47.

In operation, drive means (not shown) through rotor shaft 32 turn rotor body 36. Feed fluid is passed through product feed inlet 14 onto distributor plate 24 where it in turn passes through weir opening 26 onto the internal wall of shell 12. A suitable heated fluid is circulated through jacket 18 thus heating the walls of shell 12.

Wiper blades 56, formed of a suitable low friction material, such as glass-filled polyfluoroethylene polymer, are urged against the internal surface of shell 12 by springs 52. The wiper blades 56 distribute the product in a thin uniform film over the evaporator shell wall permitting vaporization of the lower boiling constituents of the feed.

Vaporized material then passes through the openings 38 of rotor body 36 into the void of said rotor body 36 wherein they contact condenser 27, are condensed thereon and flow out as distillate through condenser outlet 29 at the bottom of condenser 27.

Constituents of the feed which are not vaporized continue down the wall of shell 12 and pass out of the apparatus through residue outlet 16.

Where an adjustment of the wiper pressure in a uniform manner is desired, screws 47 are loosened and adjustment screws 50 are used to push against projections 48 thereby fixing the position of torsion bar 42 at any desired angle.

As the volatile components of the feed product are evaporated the viscosity of the residue changes, thus it is desirable or necessary to increase or decrease the force on wiper blades 56 to maintain a uniform thickness of the fluid film. In the present invention, this is effected by adjusting screws 50 while holding transverse plate 44 in a fixed position. Such adjustment develops a twisting or torsion effect in torsion bar 42 which causes greater displacement of flat springs 52 adjacent to lower end of torsion bar 42 than of flat springs adjacent to upper end of torsion bar 42 thus varying the wiper loading pressure along the length of the row of blades connected to said torsion bar.

It is apparent that wiper assemblies and evaporators having wiper assemblies according to the present invention have distinct advantages over prior art apparatus. The present invention makes possible the economic production of large diameter shells with wiper performance equivalent to that previously obtainable only in small shells. Further, wiper pressure can be adjusted to provide optimum wiper pressure for different evaporating operations, and optimum wiper pressure for differing portions of a single evaporating operation.

In traditional channel type mountings, the wiper pressure is provided by centrifugal forces and wiper pressure is a function of rotor speed only. Further to prevent cocking of the wipers in their channels, it is common to increase the wiper depth. This, of course, increases the cost of the wiper. In addition, product-build-up tends to impair the sliding motion within the channels so that the wipers may not follow the shell configuration at all. In contrast, wiper blades according to the invention are free to move in and out relative to the shell and there are no sliding motions between the blade and the rotor which thus eliminates this cause of wiper path distortion.

In prior art wipers generally, and the channel type wiper particularly, the rotor is necessarily heavy because of the design considerations. When used in combination with the present invention, the rotor assembly need not be as massive, which in turn increases the critical speed and reduces the problem of excess vibration.

A typical 12 inch shell diameter rotor assembly according to the invention has 4 (four) rows of wipers equally spaced about the circumference of the rotor. Individual wiper blades approximately 12 inches long are oriented end-to-end in vertical lines. Each blade is connected to two leaf springs, which in turn are fastened to torsion bars running the vertical length of the rotor. If the torsion bar is uniformly rotated while the blades are touching the shell, the clearance between the wiper and blades will be adjusted. If the torsion bar is rotated at one end while being held stationary at the other, the wipers closest to the twisting force will be forced toward the shell more than the wipers further away, thus creating a pressure gradient along the length of the wipers.

The term torsion bar as used herein refers to an elongated elastic member or spring element wherein one end of the member can be rotated relative to the other to twist or impart a torque to the member.

The term wiper element as used herein refers to wiper blades, vanes, brushes or other suitable members useful to reduce fluid thickness on a surface.

The term wiping relationship as used herein refers to the situation where a wiper element is urged again a fluid laden surface with sufficient force to reduce the fluid thickness, whether the element actually contacts the surface or not.

In the invention as described, flat springs have been used to urge the wiper elements into a wiping relationship. Flat springs are preferred because they are particularly free of contamination sites and are easy to clean. However, the other advantages of the invention such as the elimination of critical rotor speed control may be achieved by the use of any bias means which would tend to positively urge and maintain the wiper elements in a wiping relationship.

It should also be understood that apparatus wherein the shell would rotate about a stationary axis having wiper elements mounted thereon would not depart from the basic principles taught herein.

While the embodiments described and illustrated may be modified in various ways readily apparent to those skilled in the art, the invention is intended to include those within the spirit and scope of the following claims.

We claim:
1. In apparatus having a surface over which liquid is caused to flow and is then wiped to film thickness, a wiper assembly comprising:
 (a) a rotor member;
 (b) an elongated elastic member extending substantially the full length of the rotor member and mounted upon the rotor member substantially parallel to the rotational axis thereof;
 (c) bias means connected to the elongated elastic member and positioned between the elongated elastic member and the surface;
 (d) a wiper element connected to the bias means and positioned so that the bias means urges the wiper element into a wiping relationship with the surface; and
 (e) means for rotating one end of the elongated elastic member relative to another to move the wiper element adjacent one end of the elastic member a farther distance with respect to the surface than the wiper element adjacent another end of the elastic member,
whereby a pressure gradient is created along the length of the wiper element.

2. Apparatus according to claim 1 wherein the bias means are cantilevered leaf springs extending in a substantially tangential direction from the rotor member toward the surface.

3. In apparatus having a surface disposed about a void, and in which a liquid is caused to flow and is then wiped over said surface to film thickness, a wiper assembly comprising:
 (a) a rotor member positioned within the void formed by the surface;
 (b) a rotatable elongated elastic torsion bar mounted upon the rotor member substantially parallel to the rotational axis of the rotor member and extending substantially the full length of the rotor member:
 (c) bias means connected to the torsion bar and extending substantially tangentially from the rotor member towards the surface in a direction generally opposite to the direction of rotation, the bias means being laterally movable in response to rotation of the torsion bar;
 (d) a wiper element mounted upon the bias means and positioned so that the bias means urges the wiper element into a wiping relationship with the surface; and
 (e) means operatively connected to the elongated elastic torsion bar for rotating one end of the bar relative to another, whereby, rotation of one end of the torsion bar relative to another will effect changes in the force exerted by the bias means when the wiper is in a wiping relationship.

4. Apparatus according to claim 3 wherein the bias means are leaf springs.

5. Apparatus according to claim 3 further comprising means for maintaining a first end of the torsion bar in a fixed position and means for rotating the other end of the torsion bar while maintaining the first end in a fixed position to impart a torque force to the torsion bar whereby the forces exerted by the wiper elements upon the surface will vary from one end to the other.

6. Apparatus according to claim 3 further comprising:
 (a) transverse plate rigidly fixed to a first end of the torsion bar, generally normal thereto and having elongated openings therein;
 (b) screws adapted for detachably affixing the transverse plate to the rotor member;
 (c) a pair of opposed projections extending laterally from the other end of torsion bar; and
 (d) a pair of adjusting screws adapted to abut the projections and to adjustably exert force thereon thus transmitting rotating forces to the torsion bar.

References Cited

UNITED STATES PATENTS 3,190,817 6/1965 Neugebauer et al.
1,308,819 7/1919 Taylor.

FOREIGN PATENTS 638,468 6/1950 Great Britain.

CHARLES A. WILLMUTH, *Primary Examiner.*

LEON G. MACHLIN, *Assistant Examiner.*